W. J. GIRLING & E. C. SCHWAB.
KNITTED GLOVE AND METHOD OF MAKING SAME.
APPLICATION FILED JUNE 25, 1917.
1,260,368.
Patented Mar. 26, 1918.
2 SHEETS—SHEET 1.
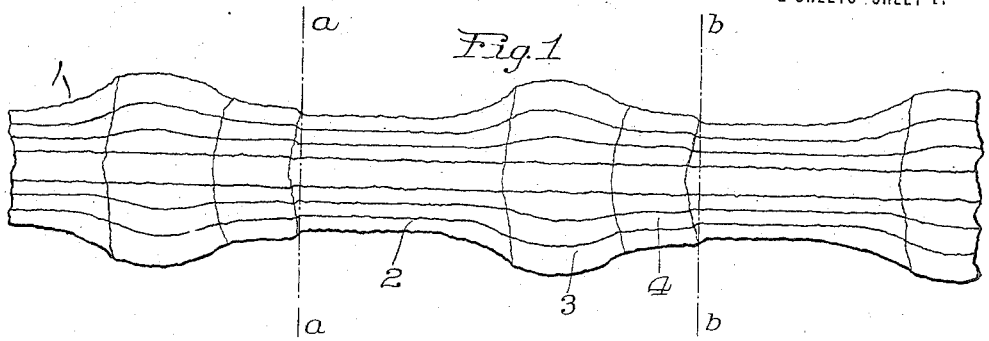
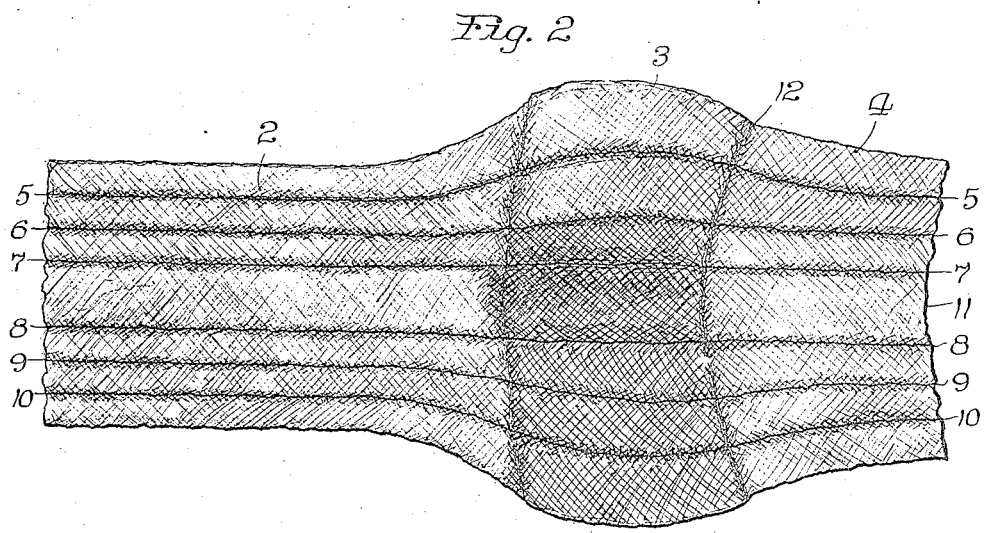
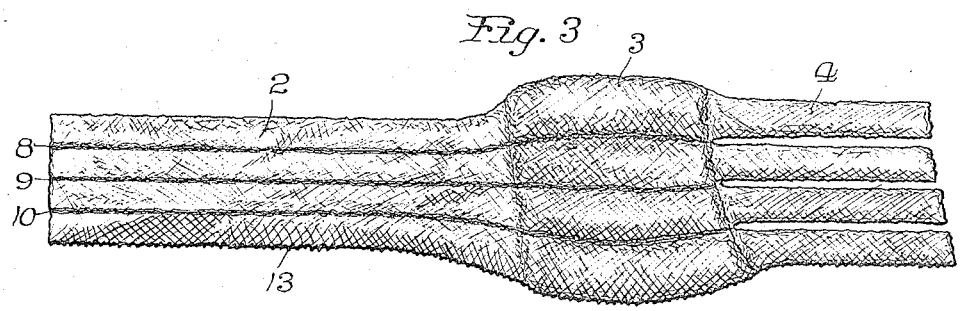
Inventors
William J. Girling
Edward C. Schwab
By Brown, Hanson & Boettcher
Attorneys

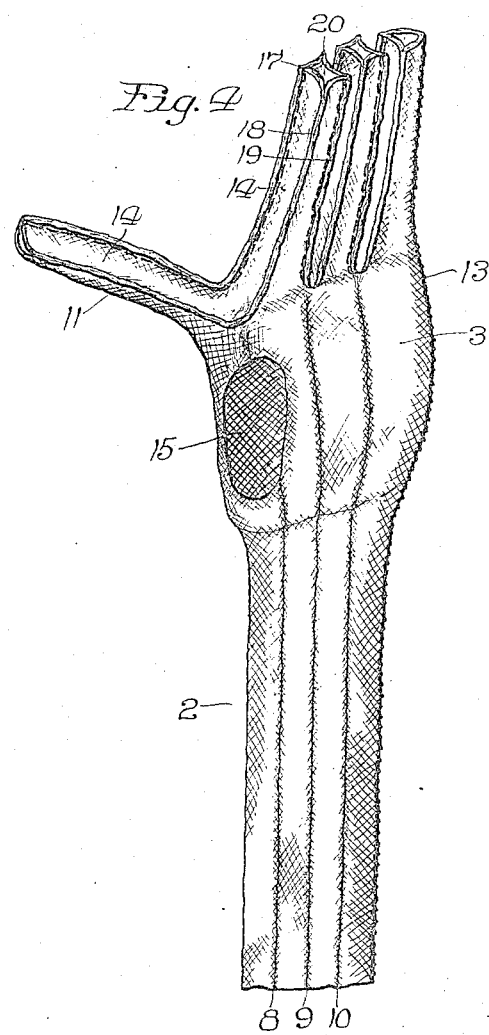
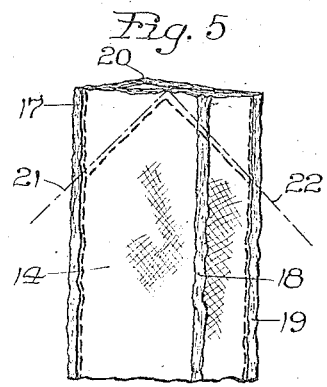
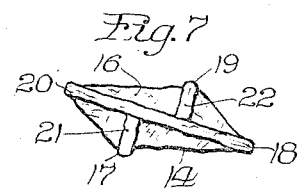
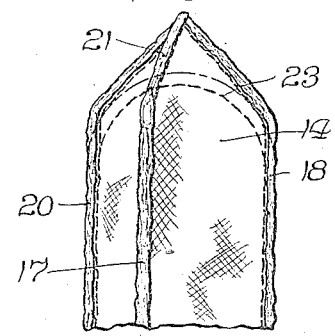

UNITED STATES PATENT OFFICE.

WILLIAM J. GIRLING AND EDWARD C. SCHWAB, OF MILWAUKEE, WISCONSIN, ASSIGNORS TO PHOENIX KNITTING WORKS, OF MILWAUKEE, WISCONSIN, A CORPORATION OF WISCONSIN.

KNITTED GLOVE AND METHOD OF MAKING SAME.

1,260,368.

Specification of Letters Patent.

Patented Mar. 26, 1918.

Application filed June 25, 1917. Serial No. 176,726.

*To all whom it may concern:*

Be it known that we, WILLIAM J. GIRLING and EDWARD C. SCHWAB, both residing at Milwaukee, in the county of Milwaukee and State of Wisconsin, have invented a certain new and useful Improvement in Knitted Gloves and Methods of Making Same, of which the following is a full, clear, concise, and exact description, reference being had to the accompanying drawings, forming a part of this specification.

Our invention relates to a knitted glove and method of making the same.

Gloves of this class, as heretofore constructed, have had insufficient material in the fingers of the same and have had points of weakness at the crotch between fingers.

The object of our invention is to provide a structure which will obviate the above disadvantages; which will have sufficient material in the fingers to give a good shape to the same and to provide a warm, well-fitting structure without the weakness in the crotch between the adjacent fingers. A further object of the invention is to provide a new method of manufacturing such a glove. A further object is to provide a novel manner of closing the ends of the fingers of the glove. Other more specific objects will be apparent from the following specification.

In the accompanying drawings which form a part of the present specification we have illustrated an embodiment of our invention.

Figure 1 is an elevational view of the continuous strip turned out by the knitting machine;

Fig. 2 is a similar view of a blank cut from the strip shown in Fig. 1;

Fig. 3 shows the blank after the same has been cut along the lines of the fingers and sewed at the rear edge;

Fig. 4 shows the manner in which the gussets are sewed to the edges of the finger portions;

Fig. 5 illustrates the manner in which the ends of the fingers are first sewed and trimmed to close the same;

Fig. 6 shows a second step in closing the ends of the fingers; and

Fig. 7 is an end view of the completed finger end.

According to our invention a continuous knitted strip 1 is produced as by means of an automatic machine. This strip comprises recurring portions, namely, a wrist or gauntlet portion 2, palm portion 3 and finger portion 4. The strip 1 is cut substantially along the lines *aa* and *bb* to produce a blank such as illustrated in Fig. 2.

The gauntlet portion 2 is of an elastic texture to permit the hand to be introduced to the same when the glove is placed on the hand. The palm portion 3 and the finger portion 4 are made of relatively inelastic structure compared with the wrist portion 2. It is to be understood, however, that the palm and finger portions are yielding being made of woolen yarn closely knitted. The strip 1 is marked by means of the lines 5, 6, 7, 8, 9, and 10. These lines are formed by dropping a needle in the knitting machine. The blank is thus divided into a wide central portion 11 and three strips on each side thereof, as divided off by the above mentioned lines.

The strip 1 is cut as along the lines *aa—bb* to form individual glove blanks. The blank is then cut along the lines 5, 6, 7, 8, 9, and 10 at the finger part of the blank down to the part where the finger portion 4 joins the palm portion 3 as is indicated by the line 12. The blank is then folded along a median line and the free edges are joined together by means of the seam 13. This produces a tubular structure for the wrist and palm portions and the finger portions comprise a series of overlapping strips. The lines 5, 6 and 7 register with the lines 8, 9 and 10. A narrow strip or gusset of equal width throughout its entire length is then sewed to the free edges of the finger portions in the manner illustrated in Fig. 4. This strip 14 which forms the gusset is of a width substantially equal to the thickness of the fingers of the hand to be fitted. The resulting structure is shown in Fig. 4. The wide central strip 11 forms the front edge of the index finger of the hand. The seam 13 lies along the outer edge of the little finger of the hand to be fitted. The proper opening 15 is then made in the palm portion for attaching the thumb part not shown which is formed of one piece and attached in a manner well understood by those skilled in the art. The wrist or gauntlet portion is turned up and the lower edge is attached just below the palm portion 3, as is usual, in this type of glove.

The ends of the fingers are closed by two operations which produce a closure shown in Fig. 7.

The end of the finger is first crushed flat on the line of the seams 17 and 19 and a seam is sewed substantially on the lines 21 and 22. The seam is trimmed at the same time so that the resultant effect is a sharply pointed finger end closed on the lines 21—22. The finger is then crushed flat in the plane of the seam 18—20 and is sewed and trimmed along a curved line 23 as shown in Fig. 6.

This curved line intersects the lines 21 and 22 giving a resultant closure illustrated in Fig. 7. This closure does not bunch the material all at one point, as has previously been the practice, but produces a good closure and a clean tip.

The entire glove is then turned inside out, that is to say, the seams are turned on the inside and the glove is ready for use.

The gusset 14 which is continuous along the one side of one finger through the crotch between the fingers and to the adjacent finger provides the additional material which is necessary to give the glove good fitting quality.

The additional material keeps the fingers warm and prevents excessive stretching at this part, as was the fault with the gloves constructed according to the prior art.

The strength of the glove at the gusset is very greatly increased.

A uniform size of finger is maintained as the finger parts are cut from the blanks along the lines which are made when the blank is knitted. The elasticity of the gusset provides ample room for the web between the fingers on the hand.

We claim:

1. A blank for a glove comprising a flat piece of knitted material having a gauntlet, a palm portion and a finger portion, said blank having distinctive continuous lines running lengthwise of the same throughout its entire length and dividing it lengthwise into a relatively wide central strip and a plurality of relatively narrow strips on each side thereof.

2. A blank for a glove comprising a flat piece of knitted material having an elastic gauntlet portion, a palm portion of relatively inelastic texture, and a finger portion of relatively inelastic texture, said blank having six continuous lines running lengthwise of the same and dividing the same into a relatively wide central strip and three relatively narrow strips on each side thereof.

3. In a glove a front and back formed of a flat knit piece folded and having its free edges joined, said front and back comprising integral fingers, palm and gauntlet portions, and gussets comprising continuous straight strips of knit material, said gussets being of substantially uniform width throughout their entire length, said gussets being joined by seams directly to said front and back portions along the edges of the finger portions.

4. The process of making a knitted glove which consists in producing a continuous knitted strip of glove blanks, said glove blanks comprising finger, palm and gauntlet portions in successive order, severing said strips into blanks, slitting the finger portions of said blanks, folding the blank so that the finger portions form front and back portions of the fingers, joining the free lateral edges of the folded blanks and applying continuous strips or gussets between front and rear finger portions between adjacent fingers.

5. The process of making a knitted wool glove which consists in knitting a continuous blank having finger, palm and gauntlet portions, with lines indicating the finger portions, then slitting the finger portion on said lines, then folding the blank so that the finger portions form front and back portions of the fingers of the glove, joining the free lateral edges of the folded blank and applying continuous strips or gussets between the front and rear finger portions between adjacent fingers.

6. The method of closing finger ends or the like which consists in crushing the finger member flat in one plane, securing the edges together by two lines of union forming an angle between them, then crushing the member flat in another plane and sewing across the previous lines of union in a relatively curved line, and trimming said seams.

7. The method of closing a knit woolen finger end of four pieces which consists in crushing the member flat along two seams, then sewing and trimming on two lines which form an angle between them, then crushing the member flat on the other two seams and sewing and trimming across the previous seams in a relatively curved line and then turning the member inside out.

In witness whereof, we hereunto subscribe our names this 22nd day of June, A. D. 1917.

WILLIAM J. GIRLING.
EDW. C. SCHWAB.